(12) United States Patent
Lee (10) Patent No.: US 8,702,269 B2
(45) Date of Patent: Apr. 22, 2014

(54) OUTDOOR LAMP

(75) Inventor: Jae Hak Lee, Gyeonggi-do (KR)

(73) Assignee: ISC Co., Ltd., Gyeonggi-do (KR)

( * ) Notice: Subject to any disclaimer, the term of this patent is extended or adjusted under 35 U.S.C. 154(b) by 262 days.

(21) Appl. No.: 13/386,740

(22) PCT Filed: Jul. 6, 2010

(86) PCT No.: PCT/KR2010/004370
§ 371 (c)(1),
(2), (4) Date: Jan. 24, 2012

(87) PCT Pub. No.: WO2011/013913
PCT Pub. Date: Feb. 3, 2011

(65) Prior Publication Data
US 2012/0127713 A1 May 24, 2012

(30) Foreign Application Priority Data

Jul. 29, 2009 (KR) ........................ 10-2009-0069502

(51) Int. Cl.
*F21V 1/00* (2006.01)
(52) U.S. Cl.
USPC ..................................... 362/235; 362/249.07
(58) Field of Classification Search
USPC .................. 362/235, 249.07, 249.01–249.03
See application file for complete search history.

(56) References Cited

U.S. PATENT DOCUMENTS

| | | |
|---|---|---|
| 2008/0062691 A1 | 3/2008 | Villard et al. |
| 2009/0141494 A1 | 6/2009 | Zhang et al. |
| 2009/0168422 A1 | 7/2009 | Chiu et al. |

FOREIGN PATENT DOCUMENTS

| | | |
|---|---|---|
| JP | 2001-325805 A | 11/2001 |
| JP | 2006-286310 A | 10/2006 |
| KR | 1020090006720 A | 1/2009 |
| KR | 100900953 B1 | 5/2009 |
| KR | 100915529 B1 | 8/2009 |

OTHER PUBLICATIONS

International Search Report: mailed Feb. 18, 2011; PCT/KR2010/004370.

*Primary Examiner* — Vip Patel
(74) *Attorney, Agent, or Firm* — Ladas & Parry LLP (57) ABSTRACT

An outdoor lamp. The outdoor lamp includes: a plurality of frame members rotatably connected to each other by hinge members so as to change relative rotation angles; optical source modules each comprising an optical source for emitting light, each of the optical source modules installed attachably to and detachably from the frame members; and rotation restriction units each combined to the frame members to restrict the relative rotation angles of the frame members so as for the frame members to be fixed at desired angles. According to the outdoor lamp, the optical source modules are installed to the rotatable frame members so that optical angles may be easily controlled according to an installation condition for the lamp.

13 Claims, 6 Drawing Sheets

OUTDOOR LAMP

TECHNICAL FIELD

The present invention relates to an outdoor lamp, and more particularly, to an outdoor lamp that includes a frame member, wherein an optical source module is installed to the frame member and the frame member may be rotated according to the installation condition of the optical source module.

BACKGROUND ART

In general, outdoor lamps are arranged at a regular interval on roadsides, both sides of bridges, and within tunnels of highways and roads that are to be lit. Outdoor lamps contribute to safe driving and produce various effects by illuminating cities. Lighting performed by such outdoor lamps is controlled by a central monitor. In order to fully perform such functions, a minimum level of illumination may be required and thus mainly high-pressure sodium lamps are used. However, though high-pressure sodium lamps may secure such a level of illumination, such lamps have high power consumption and thus energy use is high.

Accordingly, light emitting diode (LED) lighting apparatuses, which may provide light using a minimum amount of electricity, have recently been introduced. However, LEDs used in LED lighting apparatuses have a limited directional angle of about 90° for emitting light and thus it is difficult to increase a range that may be illuminated. Also, as energy use is low in LED apparatuses, illumination is low.

Figure 1:
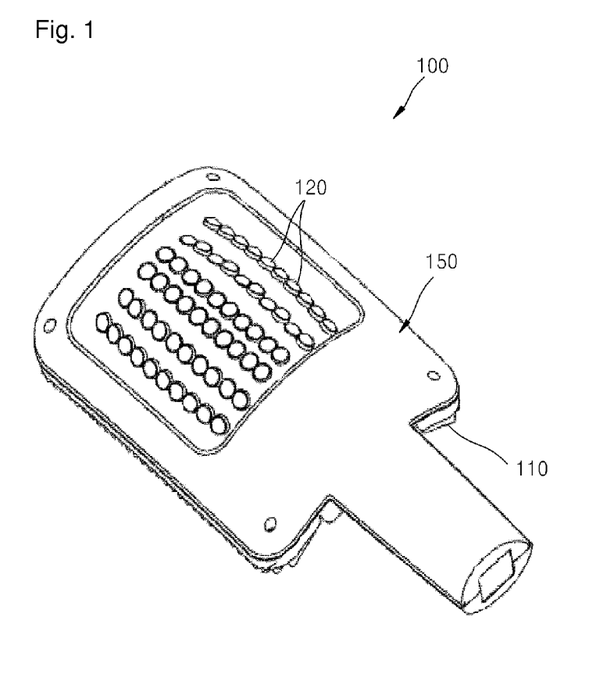
FIG. 1 is a perspective view of a general outdoor lamp.
Figure 2:
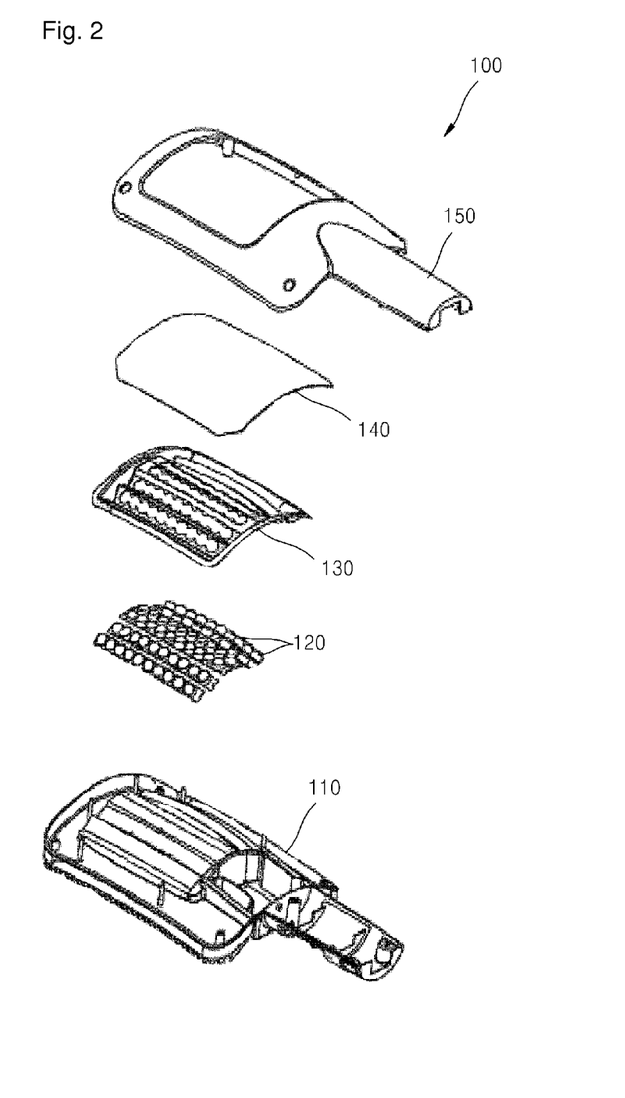
FIG. 2 is an exploded perspective view of the outdoor lamp of FIG. 1.

Accordingly, as the prior art, FIGS. 1 and 2 illustrate an outdoor lamp disclosed in KR 10-2009-0006720. In a lamp 100 according to the prior art, a body frame 110 is formed having a curved form and a plurality of LEDs 120 are attached to the body frame 110 according to the curved form of the body frame 110 so as to increase a range illuminated. Also, the body frame 110 includes a reflective plate 130, a light emission plate 140, and an upper frame 150, wherein the reflective plate 130, the light emission plate 140, and the upper frame 150 are formed according to the curved form of the body frame 110.

Thus, as the plurality of LEDs 120 are attached to the body frame 110, illumination may not be deteriorated compared with general lighting apparatuses using a single LED.

DISCLOSURE OF INVENTION

Technical Problem

However, in LED lamps according to the prior art, a separate mold may be required to be manufactured according to a manufacturing condition and thus a huge amount of initial development expenses is needed to produce LED lamps that meet required conditions. Also, such LED lamps transfer heat to a body frame integrally formed therewith and thus heat transfer may not be great.

In particular, lighting standards of outdoor lamps such as street lights and security lights vary by countries or local governments, and in some cases, configurations and forms of LEDs are required to be changed according to road conditions, intervals of lamp poles, and heights of lamps. In the prior art, the body frame is integrally formed as a single body so that once manufacture of the body frame is completed, the form thereof may not be changed. Accordingly, a new mold may be required to be manufactured to meet manufacturing conditions.

Also, the body frame transfers heat as a single body and thus LEDs may not efficiently transfer heat, thereby significantly decreasing heat transfer efficiency.

In addition, when LEDs need to be replaced due to expiration of lifetime or damage, it is difficult to replace the LEDs since the body frame is formed as a single body, and time may be wasted or physical loss may inevitably occur due to the replacement.

Solution to Problem

The present invention provides an outdoor lamp in which a lighting condition thereof may be easily changed according to an installation condition, an optical source may efficiently transfer heat, and replacement thereof is easy so as to facilitate maintenance.

According to an aspect of the present invention, there is provided an outdoor lamp including: a plurality of frame members rotatably connected to each other by hinge members so as to change relative rotation angles; optical source modules each comprising an optical source for emitting light, each of the optical source modules installed attachably to and detachably from the frame members; and rotation restriction units each combined to the frame members to restrict the relative rotation angles of the frame members so as for the frame members to be fixed at desired angles.

The hinge members may each include: a first hinge having a circular cross-section extended in one direction along an edge of any one frame member; and a second hinge extended in one direction along the edge of one frame member adjacent to the any one frame member on which the first hinge is disposed, the second hinge having an inner circumference surface that corresponds to an outer circumference surface of the first hinge and comprising a slot cut in the one direction.

The rotation restriction units may each include: a contact plate comprising a first member for contacting any one frame member and a second member extended from the first member, fixed while inclining against the first member by a predetermined angle, and contacting one frame member adjacent to the any one frame member; and a fixing member for fixing the first member and second member to the frame members, respectively.

The optical source modules may each include: a substrate; a heat radiator disposed on a lower surface of the substrate and combined to one frame member; an optical source comprising an LED or an OLED attached on an upper surface of the substrate; and a lens combined to the substrate to cover the optical source.

The heat radiator may include: a plurality of heat radiation plates arranged spaced apart from each other by a predetermined interval in a direction perpendicular to the frame members; and connection members for connecting the plurality of heat radiation plates to each other.

The frame members may each include projection parts extended in one direction and the heat radiator comprises fixing grooves inserted into the projection parts to slide while combined to the projection parts.

A plurality of the optical sources may be arranged on the substrate and the lens refracts light emitted from the optical sources so as for the lens attached to the optical sources to each have different directional angle.

A plurality of the optical sources may be arranged on the substrate and at least one lens from among the lens combined to the optical sources refracts light emitted from the optical sources so as for a left angle and a right angle of the directional angle to be different from each other based on a center line perpendicular to the substrate.

The outdoor lamp may further include a cover member for covering a plurality of the optical sources and combined to the substrate to seal the optical sources from outside elements and wherein the lens may be integrally formed with the cover member as a single body.

The lens may include accommodation grooves formed concavely to have a predetermined radius of curvature on a back surface of the cover member that faces the optical sources and the accommodation grooves are disposed to correspond to the optical sources The lens may include projection units projected to have a predetermined radius of curvature on surface of the cover member and the projection units may be disposed to correspond to the optical sources.

Wall members surrounding the optical sources along the edges of the accommodation grooves and extending to a lower side may be disposed around the accommodation grooves.

The cover member may further include sealing grooves for forming predetermined closed spaces between the cover member and the substrate by spacing a back surface of the cover member from the substrate on which the optical sources are disposed.

Advantageous Effects of Invention the optical source modules are conveniently slide attached to and detached from the frame members and thus the number of optical source modules may be easily adjusted.

Also, when an LED light is damaged in one optical source module, the corresponding optical source module may be removed and replaced.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

Hereinafter, one or more embodiments of the present invention will be described in detail with reference to the accompanying drawings.

Figure 3:
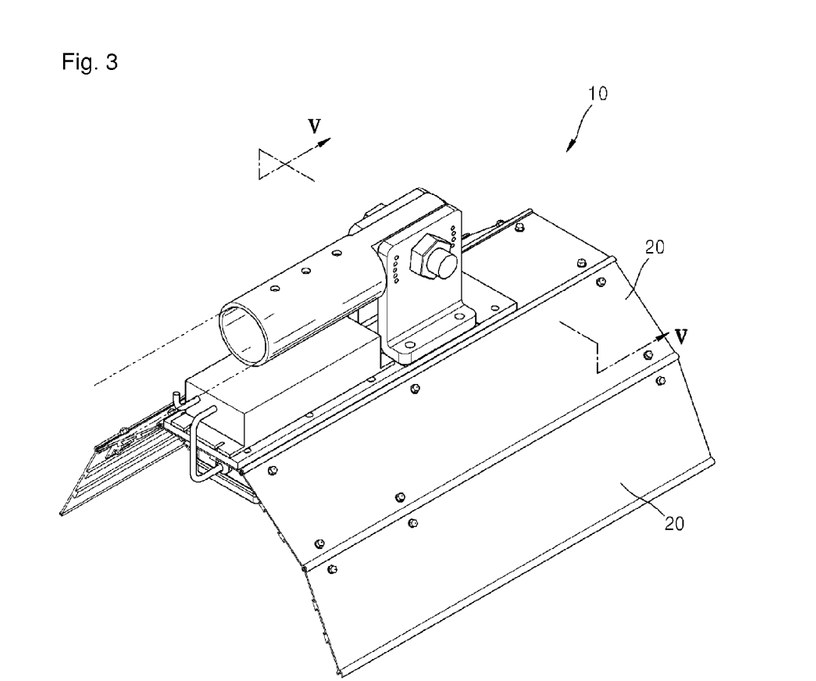
FIG. 3 is a top perspective view of an outdoor lamp according to an embodiment of the present invention.
Figure 4:
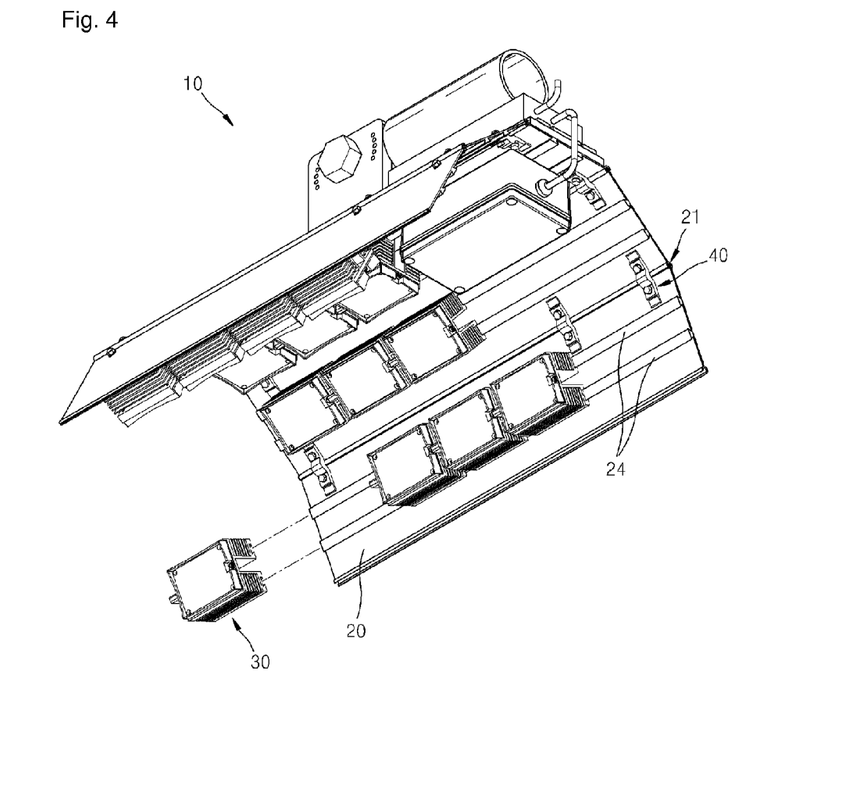
FIG. 4 is a bottom perspective view of the outdoor lamp of FIG. 3.
Figure 5:
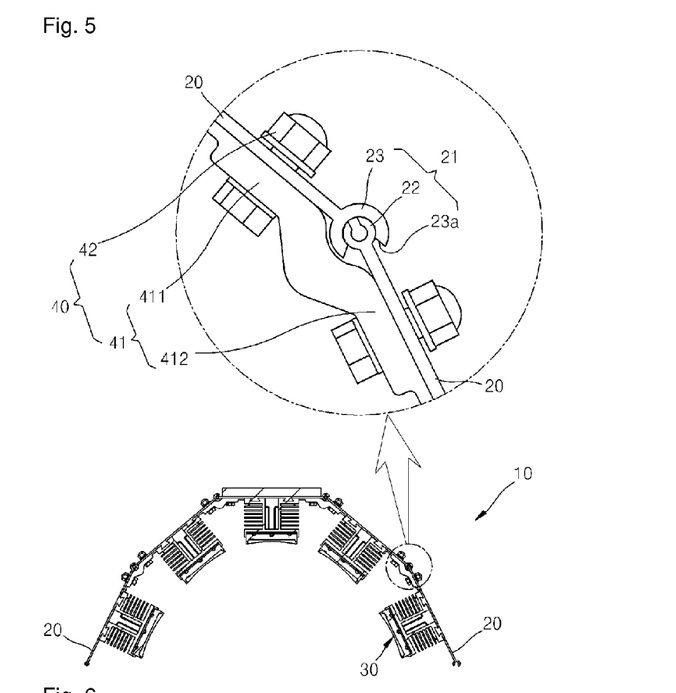
FIG. 5 is a cross-sectional view of the outdoor lamp of FIG. 3 cut along a line V-V of FIG. 3.
Figure 6:
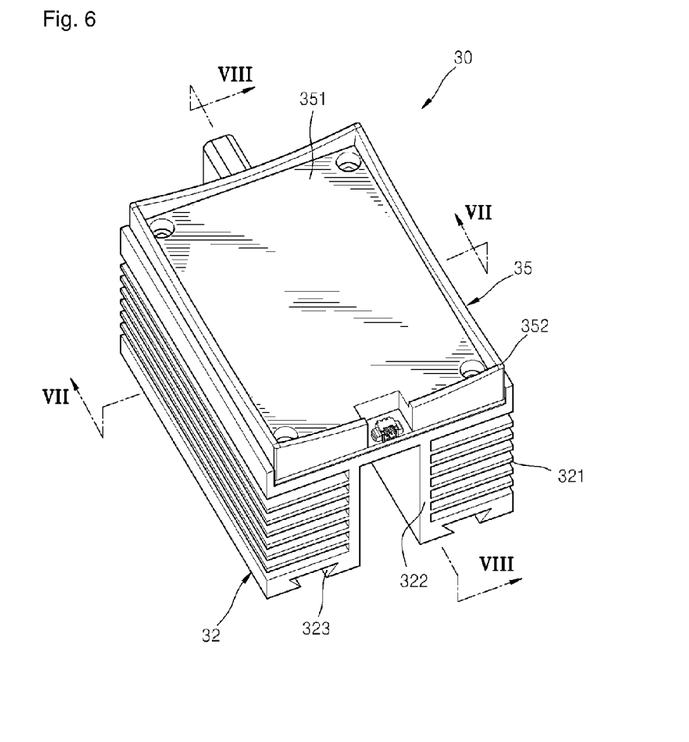
FIG. 6 is a perspective view of an optical source module included in the outdoor lamp of FIG. 3.
Figure 7:
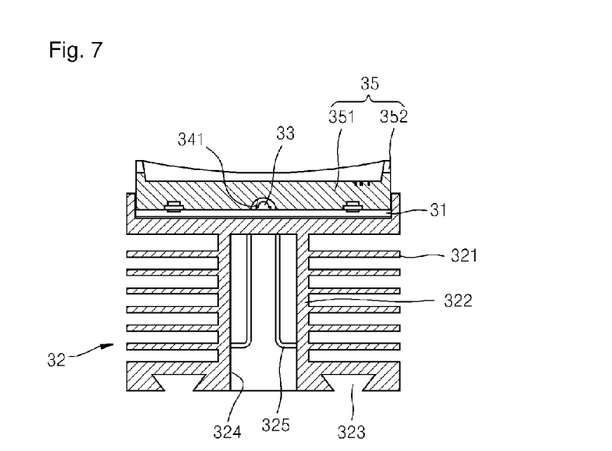
FIGS. 7 and 8 are cross-sectional views of the optical source module of FIG. 6 cut along lines VII-VII and D-D of FIG. 6, respectively.
Figure 8:
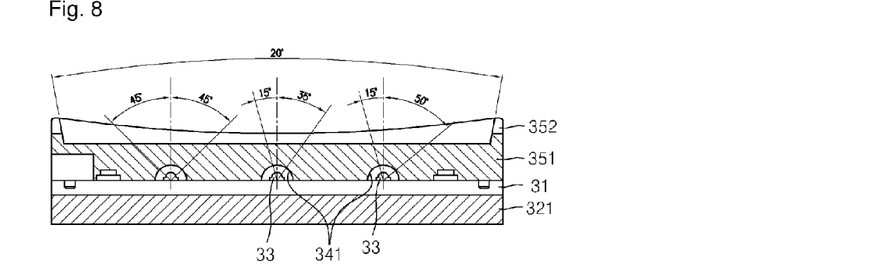
Figure 9:
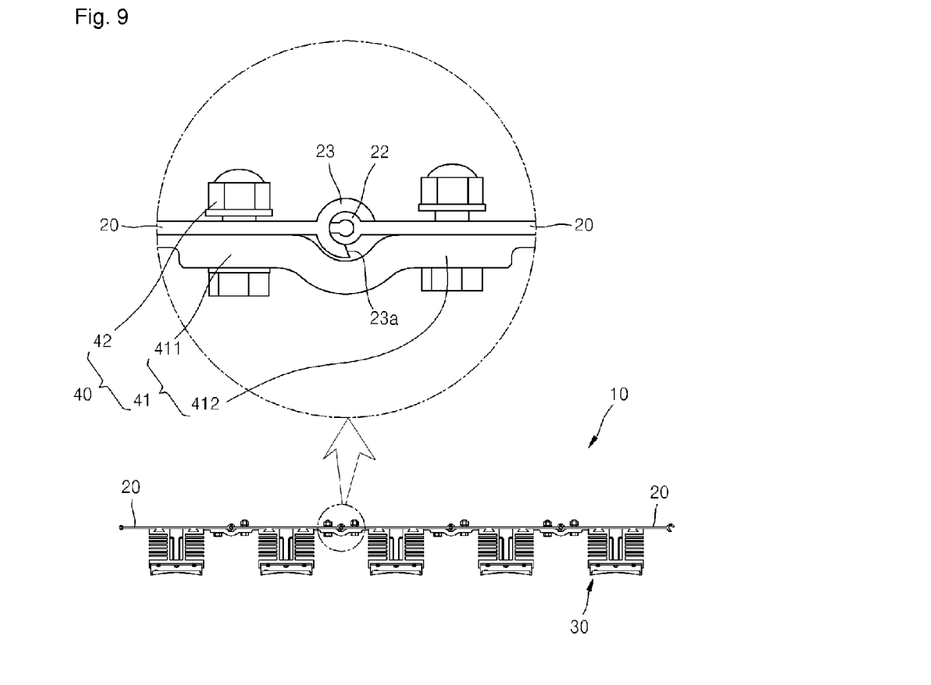
FIG. 9 illustrates an operation of the outdoor lamp of FIG. 3.

FIG. 3 is a top perspective view of an outdoor lamp 10 according to an embodiment of the present invention, FIG. 4 is a bottom perspective view of the outdoor lamp 10 of FIG. 3, FIG. 5 is a cross-sectional view of the outdoor lamp 10 of FIG. 3 cut along a line V-V of FIG. 3, FIG. 6 is a perspective view of an optical source module 30 included in the outdoor lamp 10 of FIG. 3, FIGS. 7 and 8 are cross-sectional views of the optical source module 30 of FIG. 6 cut along lines VII-VII and D-D of FIG. 6, respectively, and FIG. 9 illustrates an operation of the outdoor lamp 10 of FIG. 3.

The outdoor lamp 10 according to the current embodiment of the present invention may be used as an outdoor lamp, for example, a street light, a security light, a tunnel light, a crosswalk light, a wide-area light, a search light, a fishing lamp, a scenic lamp, or a light in a park. The outdoor lamp 10 includes a frame member 20, the optical source module 30, and a rotation restriction unit 40.

The frame member 20 may be a rectangle-form board and may be formed of a metal material such as aluminum. Here, the form of the frame member 20 is not limited to the rectangle form and the frame member 20 may have any of various forms such as a round form or an elliptical form. Also, the frame member 20 is not limited to have a board form and may have any form as long as the optical source module 30 may be attached to the frame member 20.

A plurality of the frame members 20 may be included in the outdoor lamp 10. For example, two, three, four, or more of the frame members 20 may be used according to an operational condition. The plurality of frame members 20 are arranged to be adjacent to each other in such a way that edges thereof contact each other. Here, the adjacent frame members 20 may be rotatably connected to each other by hinge members 21 so that rotation angles of the frame members 20 may be changed.

The hinge member 21 between each adjacent frame member 20 includes a first hinge 22 and a second hinge 23. The first hinge 22 is disposed on any one frame member 20 and a second hinge 23 is disposed on any one frame member 20 adjacent to the frame member 20 on which the first hinge 22 is disposed. More specifically, the first hinge 22 has a circular cross-section extended along an edge of any one frame member 20.

The second hinge 23 may rotate around the first hinge 22 while the first hinge 22 is inserted therein. The second hinge 23 may be extended along an edge of any one frame member 20 adjacent to any one frame member 20 on which the first hinge 22 is disposed and may be formed to have an inner circumference surface that corresponds to an outer circumference surface of the first hinge 22. The first hinge 22 and the second hinge 23 are combined to each other, the outer circumference surface of the first hinge 22 contact the inner circumference surface of the second hinge 23, and the second hinge 23 may rotate by a predetermined amount along the outer circumference surface of the first hinge 22. The hinge member 21 is not limited thereto and may have any of various forms, which will be described later.

A slot 23a cut in one direction is formed on a part of the second hinge 23. The slot 23a determines an allowable rotation amount of the first hinge 22 and thus the first hinge 22 may rotate by an amount corresponding to a width of the slot 23a. Due to the hinge member 21, a relative angle between each of the frame members 20 may vary within a range of about 110 to 180°.

Also, projection parts 24 extended in one direction are formed on each frame member 20 while spaced apart from each other by a predetermined interval. A cross-section of one projection part 24 may have a reversed trapezoidal form. The projection parts 24 are combined to fixing grooves 323 of heat radiators 32, which will be described later, so that the heat radiators 32 may slide while combined to the frame members 20. Once the heat radiators 32 are combined to the frame members 20, each heat radiators 32 may not be separated from its respective frame member 20 in a direction perpendicular to the frame member 20 and thus locations of the heat radiators 32 may be fixed on the frame members 20. In the drawings, the projection parts 24 are combined as a pair for each heat radiator 32. However, the present invention is not limited thereto and the number of the projection parts 24 may be determined as needed.

Also, a member that may be combined to an arm and fixing supporter of a lighting apparatus may be integrally formed with each frame member 20 as a single body, wherein the member is disposed centered on an upper surface of each frame member 20.

A plurality of the optical source modules 30 is attachably and detachably installed to the frame members 20 and each includes an optical source 33 for emitting light.

More specifically, the optical source modules 30 each includes a substrate 31, one heat radiator 32, the optical source 33, a lens, and a cover member 35.

The substrate 31 may be a printed circuit board formed of a metal material or may instead be a general printed circuit board formed of a synthetic resin. When the substrate 31 is a printed circuit board formed of a metal material, heat generated from the optical source 33 attached to the substrate 31 may be easily transmitted to the heat radiator 32 and thus heat transfer may be efficient in the optical source modules 30.

The heat radiator 32 is disposed on a lower surface of the substrate 31 and may slide while combined to one frame member 20 so as to be attached to and detached from the frame member 20. More specifically, the heat radiator 32 transfers heat generated from the optical source 33. The heat radiator 32 includes heat radiation plates 321 and connection members 322.

The heat radiation plates 321 may be formed of any of various metal materials having an excellent heat transfer property, for example, aluminum. A plurality of the heat radiation plates 321 may be prepared and may be arranged to be spaced apart from each other by a predetermined interval in a direction perpendicular to the frame member 20. The connection members 322 connect and fix the plurality of heat radiation plates 321 to each other and are extended in a direction perpendicular to the frame member 20. Such connection members 322 are arranged to connect almost center parts of the heat radiation plates 321 so that heat around the heat radiation plates 321 may be easily transferred.

Also, a pair of the connection members 322 is disposed spaced apart from each other and wires 325 for supplying power to the optical source 33 may be inserted into a space 324 between the pair of connection members 322.

A lower end of the heat radiation plates 321 may be formed to closely contact the frame member 20 so as to transmit heat from the heat radiation plates 321 to the frame member 20. Accordingly, the frame member 20 may function as a secondary heat radiation plate.

In the present invention, as the heat radiation plates 321 are disposed horizontally, productivity thereof may increase during manufacturing. Also, heated air generated from the heat radiation plates 321 may be easily transferred away from the heat radiation plates 321 by moving horizontally along the heat radiation plates 321. In particular, heated air does not remain in the heat radiation plates 321 and instead, continuously circulates between the heat radiation plates 321 even in a no-wind environment, thereby maximizing heat transfer.

The heat radiator 32 closely contacts the substrate 31 and thus may easily transfer heat transmitted from the substrate 31 away from the substrate 31.

The fixing grooves 323 are formed on the lowest end of the heat radiator 32. The fixing grooves 323 are formed having a form that corresponds to the projection parts 24 of the frame member 20 and are fixed on the projection parts 24. The fixing grooves 323 are extended from one edge to another edge of the heat radiator 32 along a longitudinal direction of the heat radiator 32. The heat radiator 32 may only slide while combined to the frame member 20 and thus may not be separated from the frame member 20.

The optical source 33 is attached on the substrate 31 and may be an LED or an OLED. An LED is a light emitting device that generates light by using a light emission phenomenon (also referred to as 'electroluminescence') that occurs when voltage is applied to a semiconductor. An LED may be formed of a material in which emission wavelengths are within a visible or near infrared ray region, luminous efficiency is high, and manufacturing of a p-n junction is possible. Examples of the material may include compound semiconductors such as gallium nitride, gallium arsenide, gallium phosphide, gallium-arsenic-phosphor, gallium-aluminum-arsenic, indium phosphide, and indium-gallium-phosphor.

An OLED may be called an organic light emitting diode or an organic electroluminescence (EL) device. More specifically, an OLED self-emits light by using an EL phenomenon to emit light when a current flows to a fluorescent organic compound.

The optical source 33 may be fixed to the substrate 31 by using an adhesive such as epoxy or an eutectic binder. However, the present invention is not limited thereto and the optical source 33 may be fixed to the substrate 31 by using any of various means.

A plurality of the optical sources 33 may be arranged in a line on the substrate 31. In the current embodiment, three optical sources 33 are disposed spaced apart from each other by a predetermined interval on the substrate 31. However, the present invention is not limited thereto and any of various numbers of the optical sources 33 may be used according to a designing condition.

The lens is disposed on an upper side of the substrate 31 so as to cover the optical sources 33 and may increase a directional angle to a desired angle by refracting light generated from the optical sources 33. The lens may be disposed spaced apart from the optical sources 33 by a predetermined interval and may be integrally formed with the cover member 35 as a single body. More specifically, the lens may include accommodation grooves 341 formed concavely to have a predetermined radius of curvature on a surface of the cover member 35 that faces the optical sources 33. As the radius of curvature of the accommodation grooves 341 is changed, a refraction angle of light is changed and thus a directional angle may be adjusted to a desired level.

The accommodation grooves 341 included in the lens are arranged based on the number of the optical sources 33 and directional angles of the accommodation grooves 341 may each be different. That is, as illustrated in FIG. 8, the radius of curvature of the accommodation grooves 341 may each be different and thus the directional angles thereof may vary, for examples, the angles may be 90°, 50°, and 65°.

Also, light is not irradiated out symmetrically about a center line and instead may be irradiated asymmetrically. In order for the directional angles to be different from each other with respect to a center line perpendicular to the substrate 31, light emitted from the optical sources 33 may be refracted. For example, as illustrated in FIG. 8, light emitted from the optical sources 33 may be irradiated in ranges of 45° and 45°, ranges of 15° and 35°, and ranges of 15° and 50°, each of which is based on a center line.

The directional angles may be adjusted to be different between the left and the right t so that it is efficient to widely diffuse light to one side and to radiate light narrowly to the other side when a topographical condition for installing the outdoor lamp 10 is inclined. That is, a directional angle in a small range is used when light needs to be irradiated mainly to a certain part. As a directional angle increases, the directional angle may be used in an area having a wide irradiation range.

An angle of a directional angle is adjusted according to a topographical condition so that uniform illumination may be maintained.

The cover member 35 is combined to the substrate 31 and the heat radiator 32 so as to seal the optical sources 33 from outside elements by covering the optical sources 33. The cover member 35 covers the substrate 31 including the optical sources 33 and thus prevents rainwater from contacting the substrate 31 and the optical sources 33, thereby protecting an internal circuit.

The cover member 35 includes a cover body 351 and a cover side plate 352, wherein the cover body 351 is disposed on the substrate 31 and the cover side plate 352 is projected from an edge of the cover body 351 and extended along the edge. The cover member 35 may be formed of epoxy, silicon resin, urethane-based resin, or a mixture thereof but is not limited thereto. The cover member 35 may be formed of any of various synthetic resins or polymer resin materials.

The cover body 351 is integrally formed with the lens as a single body and in particular, may be formed of a material used to form the lens. Also, the cover side plate 352 allows rainwater flowing from surroundings to naturally fall down to a lower part from an edge of the cover side plate 352 so that the lens and the cover body 351 may be prevented from being contaminated by a rainwater-stain.

The rotation restriction unit 40 is fixed and combined to between each of the frame members 20 so as for the frame members 20 to be fixed at a desired angle and restricts a relative rotation angle of the frame members 20. More specifically, when the relative angles of the frame members 20 are determined, the rotation restriction units 40 continuously maintain the determined angles. The rotation restriction unit 40 each includes a contact plate 41 and a fixing member 42, wherein the contact plate 41 includes a first member 411 and a second member 412.

The first member 411 contacts any one frame member 20 and is formed in the form of a bar. The second member 412 is extended from the first member 411 and is fixed while inclining against the first member 411. The second member 412 contacts the frame member 20 adjacent to the one frame member 20 and is formed in the form of a bar. In the second member 412, a part contacting the first member 411 has a curved part that corresponds to the hinge member 21.

The fixing members 42 fix the first member 411 and the second member 412 to the frame member 20, respectively. More specifically, the fixing members 42 are each formed of a bolt and a nut and thus fixes and combines the first and second members 411 and 412 to the frame member 20, respectively.

The outdoor lamp according to the present invention has the following operational effects.

After the frame members 20 are rotated to have desired angles, the rotation angles of the frame members are fixed by using the rotation restriction units 40. For example, as illustrated in FIG. 9, when the frame members 20 need to obtain rotation angles of 180°, the rotation angles of the frame members 20 are adjusted to be 180° and then the contact plates 41 contact the lower surfaces of the frame members 20.

Then, the fixing members 42 are used to fix the contact plates 41 to the frame member 20 and thus the rotation angle of each frame member 20 may be fixed. When the rotation angle is to be changed to another angle, the rotation restriction unit 40 is removed and then the rotation angles of the frame members 20 are each changed. Then, the contact plates 41, in which the first and second members 411 and 412 are inclined based on the rotation angle, are selected and are attached and fixed to the frame members 20.

In the outdoor lamp 10 according to the current embodiment of the present invention, when illumination of each frame member 20 is to vary, the number of optical source modules 30 may be changed. That is, when four optical source modules are installed to any one frame member 20 and two optical source modules 30 are installed to another frame member 20, light having a desired level of illumination may be irradiated to a desired direction.

Here, the optical source modules 30 are conveniently slide attached to and detached from the frame members 20 and thus the number of optical source modules 30 may be easily adjusted.

Also, when an LED light is damaged in one optical source module 30, the corresponding optical source module 30 may be removed and replaced.

When a refraction angle of the lens is to vary according to an installation condition, a directional angle of light irradiated in the same module is changed and symmetry of the directional angle may be changed. Thus, a desired level of light may be irradiated to a desired direction so that the ground may be uniformly illuminated according to various topographical conditions.

Also, in the current embodiment of the present invention, a plurality of the heat radiation plates 321 may be arranged in a direction horizontally to one frame member 20 and thus heated air may be easily transferred even in a no-wind topography or condition.

In addition, as one frame member 20 contacts the heat radiation plates 321, the frame member 20 may function as a secondary heat radiation plate and thereby, effective heat transfer is possible.

Moreover, as the cover side plate 352 that protects surroundings is formed on the cover member 35, rainwater falls down to a lower part from the edge of the cover side plate 352 and thus the lens may be prevented from being contaminated by a rainwater-stain.

Furthermore, in the outdoor lamp 10 according to the present invention, the cover member 35 for protecting optical sources 33 from outside elements and the lens are integrally formed with each other as a single body so that a manufacturing cost thereof is reduced compared with separately manufacturing of the cover member 35 and the lens.

Mode for the Invention

The outdoor lamp 10 according to the present invention may be modified as follows.

Figure 10:
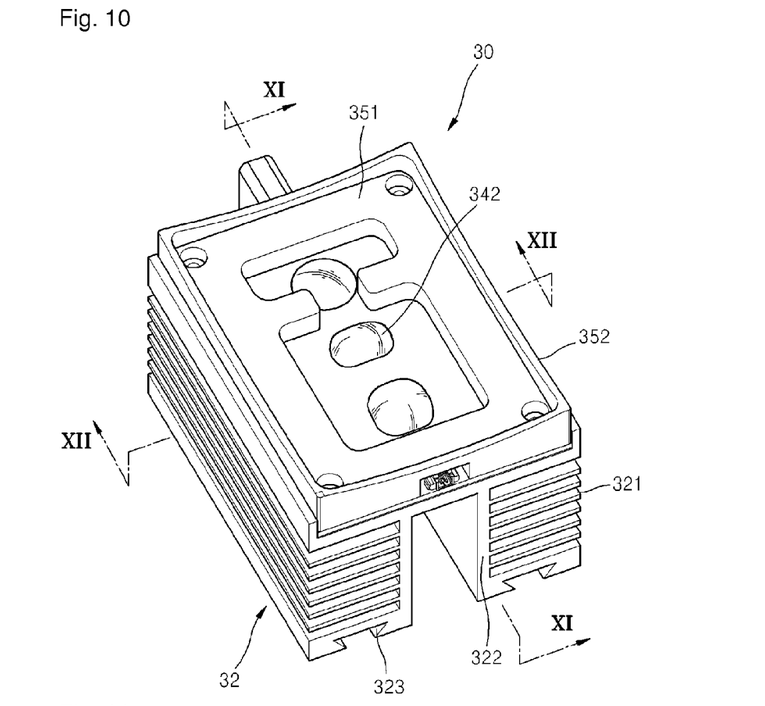
FIG. 10 is a perspective view of an outdoor lamp according to another embodiment of the present invention.

The cover member 35 according to the embodiment described above may be modified as in FIGS. 10 through 12. That is, as illustrated in FIG. 12, the cover member 35 may include projection units 342 having a predetermined radius of curvature, wherein the projection units 342 are disposed on the surface of the cover member 35. The projection units 342 are part of the lens and more specifically, are arranged to correspond to the optical sources 33. Also, the accommodation grooves 341 may be disposed on the back surface of the cover member 35. As the projection units 342 and the accommodation grooves 341 are arranged to correspond to the optical sources 33, light generated from the optical sources 33 is refracted by the projection units 342 and the accommodation grooves 341 and thus light may be irradiated at a desired angle.

Figure 11:
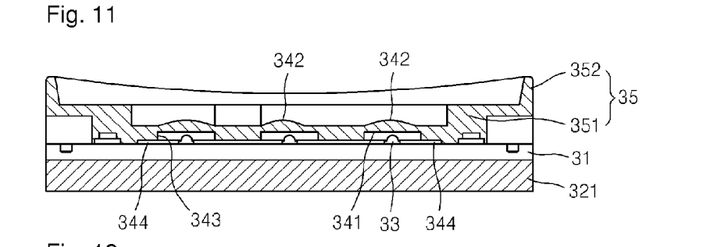
FIGS. 11 and 12 are cross-sectional views of the outdoor lamps of FIG. 10 cut along lines XI-XI and XII-XII of FIG. 10, respectively.
Figure 12:
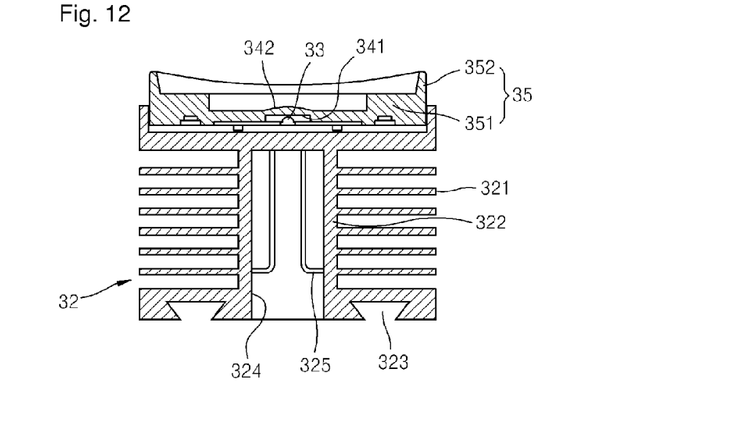

In FIG. 11, wall members 343 surrounding the optical sources 33 along the edges of the accommodation grooves 341 and extending to a lower side may be disposed around the accommodation grooves 341. The wall members 343 allow light to be concentrated on a regular range by reducing an interference between the adjacent optical source 33 and light.

Also, in FIG. 11, the cover member 35 may further include sealing grooves 344 for forming predetermined closed spaces between the cover member 35 and the substrate 31 by spacing the back surface of the cover member 35 from the adjacent substrate 31 on which the optical source 33 is disposed. These closed spaces prevent moisture from directly contacting the substrate 31 and thus protect a circuit of the substrate 31. That is, when the back surface of the cover member 35 around the optical sources 33 directly contacts the substrate 31, moisture may be permeated into a gap between the cover member 35 and the substrate 31 and thus a circuit of the substrate 31 may be damaged. However, as the closed spaces are formed, such problem may be reduced.

In the above embodiment, the rotation restriction unit includes the contact plate and the fixing member. However, the present invention is not limited thereto and any rotation restriction unit may be used as long as the rotatable frame member is fixed. That is, a pin may be inserted into the hinge member so as to stop rotating and various other forms may be used.

Also, in the above embodiment, the hinge member includes the first hinge and the second hinge. However, the present invention is not limited thereto and the hinge member may be formed as a hinge. Also, other various hinge members may be used.

In addition, in the above embodiment, an LED or an OLED is used as an optical source. However, the present invention is not limited thereto and any optical source similar to a LED or an OLED may be used.

Moreover, in the above embodiment, the cover body and the lens are integrally formed with each other as a single body; however, the present invention is not limited thereto. The cover body may be separately formed from the lens and may be formed of a material different from the lens.

According to the present invention, the outdoor lamp includes a plurality of frame members to which the optical source modules may be installed and the frame members are formed to rotate in a hinge form. Accordingly, a lighting condition may be easily changed according to an operational condition by which the lamp is installed.

Also, in the outdoor lamp according to the present invention, the optical source module includes the heat radiator including a plurality of heat radiation plates extended in a horizontal direction, wherein air may be easily circulated in the heat radiation plates. Heat generated from the optical source may be easily transferred. The frame member to which the heat radiation plates are combined may function as a secondary heat radiation plate which efficiently transfers heat from the heat radiation plates and thereby, effective heat transfer is possible.

In addition, in the outdoor lamp according to the present invention, a plurality of optical source modules may be installed to the frame member to be easily attached to and detached from the frame member so that separate replacement is possible and their maintenance is convenient.

Moreover, in the outdoor lamp according to the present invention, the cover member for protecting optical sources from an outside environment and the lens are integrally formed with each other as a single body so that a manufacturing cost thereof may be reduced compared with separately manufacturing of the cover member and the lens While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An outdoor lamp comprising:
   a plurality of frame members rotatably connected to each other by hinge members so as to change relative rotation angles;
   optical source modules each comprising an optical source for emitting light, each of the optical source modules installed attachably to and detachably from the frame members; and
   rotation restriction units each combined to the frame members to restrict the relative rotation angles of the frame members so as for the frame members to be fixed at desired angles.

2. The outdoor lamp of claim 1, wherein the hinge members each comprise:
   a first hinge having a circular cross-section extended in one direction along an edge of any one frame member; and
   a second hinge extended in one direction along the edge of one frame member adjacent to the any one frame member on which the first hinge is disposed, the second hinge having an inner circumference surface that corresponds to an outer circumference surface of the first hinge and comprising a slot cut in the one direction.

3. The outdoor lamp of claim 1, wherein the rotation restriction units each comprise:
   a contact plate comprising a first member for contacting any one frame member and a second member extended from the first member, fixed while inclining against the first member by a predetermined angle, and contacting one frame member adjacent to the any one frame member; and
   a fixing member for fixing the first member and second member to the frame members, respectively.

4. The outdoor lamp of claim 1, wherein the optical source modules each comprise:
   a substrate;
   a heat radiator disposed on a lower surface of the substrate and combined to one frame member;
   an optical source comprising an LED or an OLED attached on an upper surface of the substrate; and
   a lens combined to the substrate to cover the optical source.

5. The outdoor lamp of claim 4, wherein the heat radiator comprises:
   a plurality of heat radiation plates arranged spaced apart from each other by a predetermined interval in a direction perpendicular to the frame members; and
   connection members for connecting the plurality of heat radiation plates to each other.

6. The outdoor lamp of claim 4, wherein the frame members each comprises projection parts extended in one direction and the heat radiator comprises fixing grooves inserted into the projection parts to slide while combined to the projection parts.

7. The outdoor lamp of claim 4, wherein a plurality of the optical sources are arranged on the substrate and the lens refracts light emitted from the optical sources so as for the lens attached to the optical sources to each have different directional angle.

8. The outdoor lamp of claim 4, wherein a plurality of the optical sources are arranged on the substrate and at least one lens from among the lens combined to the optical sources refracts light emitted from the optical sources so as for a left angle and a right angle of the directional angle to be different from each other based on a center line perpendicular to the substrate.

9. The outdoor lamp of claim 4, further comprising a cover member for covering a plurality of the optical sources and combined to the substrate to seal the optical sources from outside elements and wherein the lens is integrally formed with the cover member as a single body.

10. The outdoor lamp of claim 9, wherein the lens comprises accommodation grooves formed concavely to have a predetermined radius of curvature on a back surface of the cover member that faces the optical sources and the accommodation grooves are disposed to correspond to the optical sources.

11. The outdoor lamp of claim 9, wherein the lens comprises projection units projected to have a predetermined radius of curvature on the surface of the cover member and the projection units are disposed to correspond to the optical sources.

12. The outdoor lamp of claim 10, wherein wall members surrounding the optical sources along the edges of the accommodation grooves and extending to a lower side are disposed around the accommodation grooves.

13. The outdoor lamp of claim 9, wherein the cover member further comprises sealing grooves for forming predetermined closed spaces between the cover member and the substrate by spacing a back surface of the cover member from the substrate on which the optical sources are disposed.

* * * * *